US006615194B1

(12) United States Patent
Deutsch et al.

(10) Patent No.: US 6,615,194 B1
(45) Date of Patent: *Sep. 2, 2003

(54) SYSTEM FOR SECURE EXECUTION OF CREDIT BASED POINT OF SALE PURCHASES

(75) Inventors: Douglas Anthony Deutsch, Aurora, IL (US); David B. Smith, Hinsdale, IL (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 110 days.

(21) Appl. No.: 09/092,224

(22) Filed: Jun. 5, 1998

(51) Int. Cl.[7] .............................. G06K 5/00; G06F 17/60
(52) U.S. Cl. ..................... 705/75; 235/487; 235/375; 235/379; 235/491; 705/26; 705/64; 705/75; 304/5.8
(58) Field of Search ................................ 705/39–40, 44, 705/41, 38, 35; 380/16, 7; 379/91.01; 235/473, 491, 487, 489; 713/189; G06F 17/60

(56) References Cited

U.S. PATENT DOCUMENTS

| 3,702,392 A | * | 11/1972 | St. Jean ....................... 235/380 |
| 3,731,065 A | * | 5/1973 | Zucker ............................ 705/1 |
| 4,361,757 A | * | 11/1982 | Ehrat ........................... 235/487 |
| 4,362,930 A | * | 12/1982 | Ehrat ........................... 235/487 |
| 4,439,636 A | * | 3/1984 | Newkirk et al. .............. 379/123 |
| 5,814,800 A | * | 9/1998 | Marsh et al. ................. 235/448 |
| 5,849,074 A | * | 12/1998 | Kwan |
| 5,850,446 A | * | 12/1998 | Berger et al. .................. 705/26 |
| 5,920,628 A | * | 7/1999 | Indeck et al. .................. 705/51 |
| 5,920,847 A | * | 7/1999 | Kolling et al. ................. 705/40 |

FOREIGN PATENT DOCUMENTS

| CA | 1198822 A | * | 12/1985 | ........... G06F/15/21 |
| WO | 9410659 A | * | 5/1994 | ........... G07C/9/00 |
| WO | 9525320 A1 | * | 9/1995 | ........... G07F/17/42 |

OTHER PUBLICATIONS

From DialogClassic, file 267, Seven strategies to implement your mortgage scoring model, by Credit Risk Management Report—publisher: Phillips business information, vol. 6 issue 3, Feb. 1996.*

(List continued on next page.)

Primary Examiner—Cuong Nguyen
(74) Attorney, Agent, or Firm—Patton Boggs, LLP

(57) ABSTRACT

The present system for the secure execution of credit based point of sale purchases uses a credit card that is devoid of any human readable customer account information on the face of the credit card and that encodes all the relevant account information on read only media built into the credit card. This encoded information can be encrypted or protected is some manner to prevent its retrieval by an unauthorized user. In addition, the present system makes use of a point of sale terminal to execute the transaction. In the transaction, the point of sale terminal scans the credit card to obtain the account information encoded therein and the user then inputs a personal identification number PIN to proceed to the next step of the charge process. The PIN number can be used as the cryptokey if the account information is encrypted on the card, or may simply represent a first level of user authentication. In either case, the account information and user authentication information is transmitted to a remotely located credit authorizing agency via telephone lines. Neither the credit card account number nor the type of card (VISA, MASTERCARD), nor the PIN number is displayed to the clerk on the point of sale terminal. If the credit card number and PIN number transmitted to the remotely located credit authorizing agency match the customer data stored at the remotely located credit authorizing agency, the point of sale terminal displays a copy of the user's signature (or photograph) for comparison by the clerk with the user's written authorization of the purchase (and/or physical appearance).

10 Claims, 2 Drawing Sheets

OTHER PUBLICATIONS

From DialogClassic, file 636, Standards Update, by Automated Medical Payments News, p. 1–2, Nov. 1993.*

Jennifer Friedlin Seville, The billion–dollar Question, by the Jerusalem Post, p. 8, Jun. 1996.*

Clayton, Secure ways to buy and sell goods on the Internet, by South China Morning Post, Businessn News, p. 2, Feb. 1996.*

From DialogClassic Web, file 275: Computer attendants cut parking lot's losses, Computerworld, v17 n47, p31, Nov. 1983.*

Pollick, Open–and–shut idea future is now for parking–lot gate safety system, Sarasota Herald Tribune, Jan. 1999.*

From DialogClassic Web, file 813: Frost & Sullivan: get smart about current competition within card reader markets, PR Newswire Association Inc., Oct. 1997.*

From DialogClassic Web file 813, A necessary evil: electronic access control, PR Newswire Association Inc., Oct. 1996.*

Smith, Step up security during holidays, firms advise, Washington Business Journal, vol. 14 Issue 30, p37, Dec. 1995.*

Database from Corporate ResourceNet, Modern security systems add value to facilities, Buildings, vol. 90 issue 7, p13, Jul. 1996.*

Database from Corporate ResourceNet, The power of security, Buildings, vol. 91, issue 10, p82, Nov. 1983.*

Glass, "A countdown to the age of secure electronic commerce", printed from Credit World, v86n5, pp. 29–31, ISSN: 0011–1074, May 1998.*

Mitchell, "Fraud, off–line style", printed from Credit Card Management, v10n1, pp. 16–20, ISSN: 0896–9329, Apr. 1997.*

Zagaris et al., "Money laundering, financial fault, and technology: The perils of an instantaneous economy", printed from George Washington Journal of inter. Law & Economics, v26n1, pp. 61–107, ISSN: 0748–4305, 1992.*

Kasavana, "Your card, please", printed from Restaurant Business, v91n14, pp. 264, ISSN: 0097–8043, Sep. 1992.*

Kasavana, "Processing credit cards", printed from Restaurant Business, v90n15, pp. 94, ISSN: 0097–8043, Oct. 1991.*

Loughran, "Platinum card: the greatest hustle since Barnum?", printed from Bankers Monthly, v106n7, pp. 23–26, ISSN: 0005–5476, Jul. 1989.*

"Chase launches Chase Platinum Visa and MasterCard", printed from Business Wire, Sep. 1997.*

\* cited by examiner

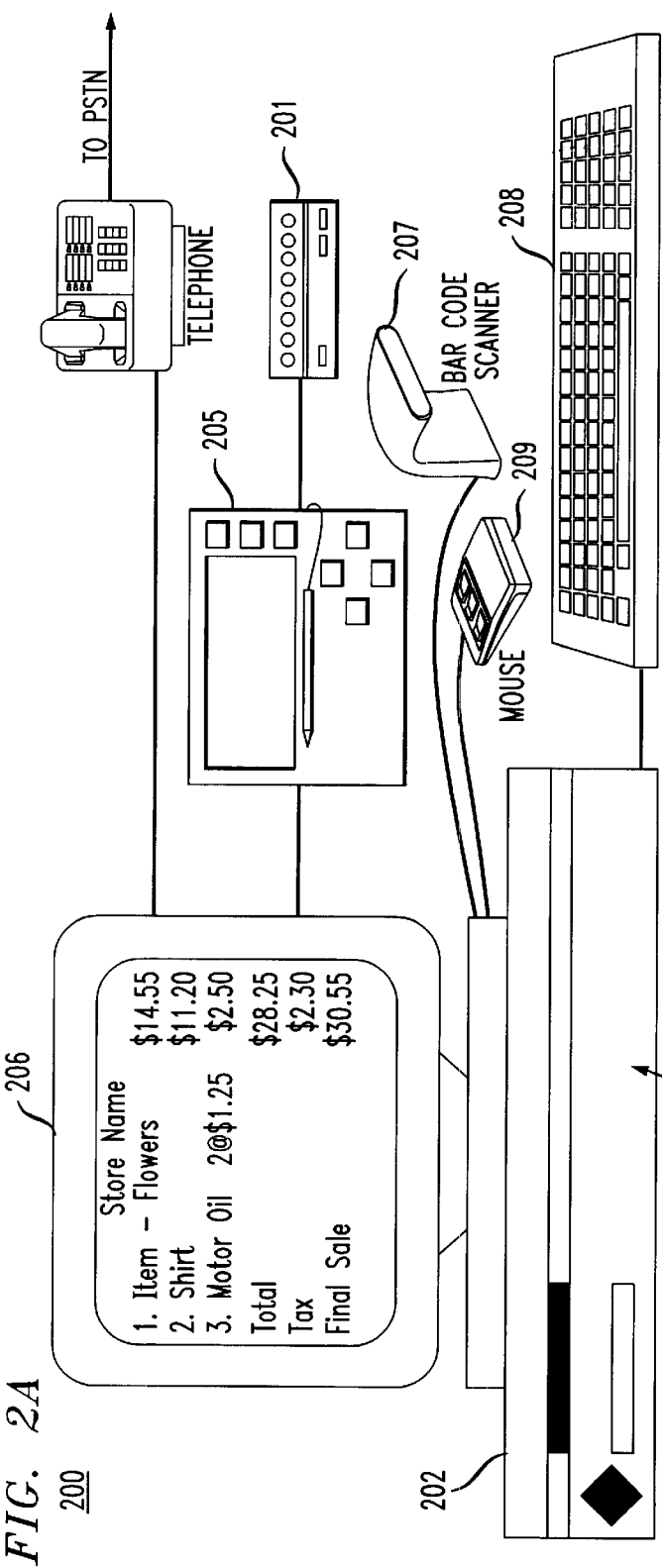
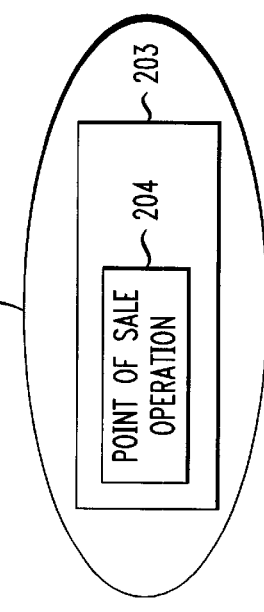
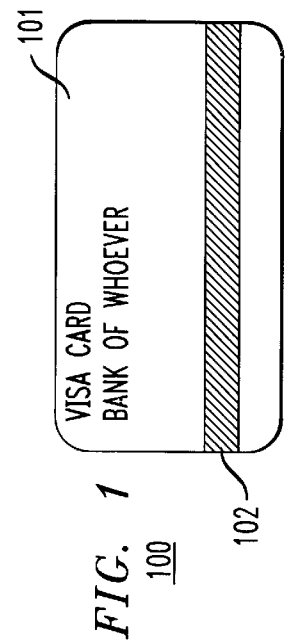

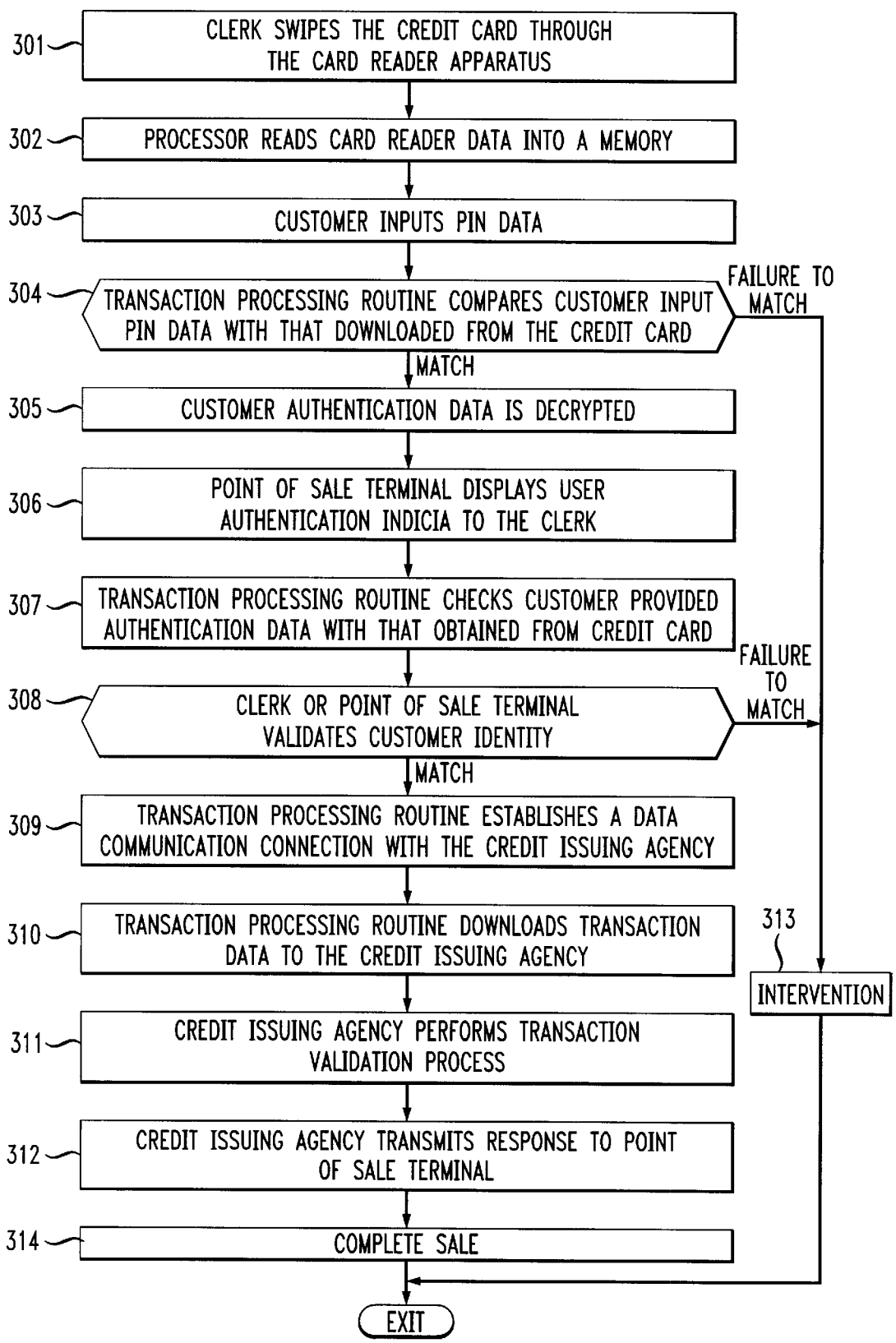

SYSTEM FOR SECURE EXECUTION OF CREDIT BASED POINT OF SALE PURCHASES

FIELD OF THE INVENTION

This invention relates to the field of point of sale terminals and, in particular, to a system for the secure execution of credit based point of sale purchases that reduces the likelihood of fraudulent transactions.

PROBLEM

It is a problem in the field of credit card services to ensure that only the authorized user of a credit card can charge purchases to the account represented by the credit card. In the present credit card environment, the card is embossed with the name of the user, the account number, credit card expiration date, as well as an identification of the type of credit card service and the issuing financial institution. Furthermore, the credit card typically includes the customers signature on the back of the card. Thus, the credit card is self defining on its face, which enables an unauthorized individual to obtain sufficient information about the credit card customer and the credit card account to make fraudulent purchases using the credit card.

This problem is partially addressed in the point of sale terminal environment by the fact that existing credit cards include a signature line on the card to provide additional security by validating the identity of the user via the "unique" signature. However, the replication of a signature is a relatively simple task and the security provided by the inclusion of a signature on the credit card is easily thwarted. A further attempt to reduce the losses occasioned by the fraudulent use of credit cards is the use by some credit cards of a photograph of the user incorporated on the credit card, which provides a significant improvement in the security provided by the credit card for face to face point of sale purchases, but is ineffective in telephone transactions and can be thwarted by the forgery of the photograph. Thus, the vast majority of credit cards are susceptible of theft and misuse without there being any truly effective security measures that can avoid this problem. In the point of sale environment particularly, the solution to this problem must be inexpensive yet effective to be commercially viable.

SOLUTION

The above described problems are solved and a technical advance achieved in the field by the present system for the secure execution of credit based point of sale purchases. This system uses a credit car that is devoid of any human readable customer account information. The credit card may include some card identification information on its face so the customer can identify the card, but the typical customer account information is absent from the face of the card. This credit card encodes all the relevant account information on machine readable media built into the credit card, so the face of the credit card contains no information that would assist an unauthorized user in making fraudulent purchases using the credit card. This encoded information can be encrypted or protected in some manner to prevent its retrieval by an unauthorized user.

In addition, the present system for the secure execution of credit based point of sale purchases makes use of a point of sale terminal to execute the transaction. In the transaction, the point of sale terminal scans the credit card to obtain the account information encoded therein. The encoded data may require the user to input a personal identification number PIN to proceed to the next step of the charge process. The PIN number can be used as the cryptokey if the account information is encrypted on the card, or may simply represent a first level of user authentication. In either case, the account information and user authentication information is transmitted to a remotely located credit authorizing agency via telephone lines. Neither the credit card account number nor the type of card (VISA, MASTERCARD), nor the PIN number is displayed to the clerk on the point of sale terminal. If the credit card number and PIN number transmitted to the remotely located credit authorizing agency match the customer data stored at the remotely located credit authorizing agency, the point of sale terminal displays a copy of the user's signature (or photograph) for comparison by the clerk with the user's written authorization of the purchase (and/or physical appearance).

BRIEF DESCRIPTION OF THE DRAWING

FIG. 1 illustrates in front plan view a credit card for use in the present system for the secure execution of credit based point of sale purchases;

FIG. 2 illustrates in block diagram form the charge processing system of the present system for the secure execution of credit based point of sale purchases; and FIG. 3 illustrates in flow diagram form the operation of the present system for the secure execution of credit based point of sale purchases in the processing of a typical transaction.

DETAILED DESCRIPTION

Credit Card Architecture

FIG. 1 illustrates in front plan view a credit card for use in the present system for the secure execution of credit based point of sale purchases and FIG. 2 illustrates in block diagram form the charge processing system of the present system for the secure execution of credit based point of sale purchases. In particular, the credit card 100 comprises a standard plastic credit card body 101 that is in use today for credit cards. Embedded in the body 101 is a readable media 102, such as a magnetic stripe, that is used to store data that relates to the use of the credit card 100. In addition, the credit card 100 is devoid of any human readable customer account information. The credit card 100 may include some minimum card identification information (issuing bank, card type, toll free number, and the like) on its face 103 so the customer can identify the card, but the typical customer account information is absent from the face of the card. This credit card 100 encodes all the relevant account information on the machine readable media 102 built into the credit card 100, so the face of the credit card 100 contains no information that would assist an unauthorized user in making fraudulent purchases using the credit card 100. This encoded information can be encrypted or protected in some manner to prevent its retrieval by an unauthorized user. As shown in FIG. 1A, the customer related data can comprise: one or more customer names and their associated Personal Identification Number(PIN), user authentication data (signature, voiceprint, photograph), encryption key, credit limit, available credit amount, and the like.

Point of Sslr Terminsl Architecture

The point of sale terminal 200 is similar in many respects to existing point of sale credit card terminals. However, its operation is unique in that it processes the customer interaction in a manner that thwarts credit card fraud. The point of sale terminal 200 includes a processor 202 that is equipped with a memory 203 into which is programmed the point of sale operations program (shown in FIG. 2A), including the transaction processing routine 204, which is described below. The point of sale terminal 200 also includes a number of data entry elements, comprising a bar code scanner 207, keyboard 208, and, optionally, mouse 209. The display 206 is standard computer display device that displays the information relating to the customer's purchases, such as shown in FIG. 2. In addition, the point of sale terminal 200 includes a credit card read/write instrument 201 and a customer signature terminal 205 to enable the customer to input their signature and other data into the system.

This architecture is extensible to telephone transactions executed from the customer's terminal device, such as a home telephone, personal computer, or other non-point of sale terminal. In these cases, the data stored in the credit card 100 must be susceptible of being read from the credit card 100 and transmitted by the terminal device to the credit agency. This can be accomplished by means of a simple credit card reader device or can even be effected by the use of a "virtual credit card" that is programmed into the terminal device to emulate the operation of the point of sale terminal.

Operation of Secure Credit Card System

FIG. 3 illustrates in flow diagram form the operation of the present system for the secure execution of credit based point of sale purchases in the processing of a typical transaction. In operation, the clerk at the point of sale terminal 200 inputs purchase data into the point of sale terminal 200 at step 300 via the use of the bar code scanner 207 and/or the keyboard 208. This data entry is displayed in traditional form on the display 206, wherein a listing of the items purchased, their cost, and the total amount due is displayed. To pay for these purchases, the customer presents the credit card 100 to the point of sale clerk who swipes or places the credit card 100 in the credit card read/write instrument 201 of point of sale terminal 200 at step 301. At step 302, the processor 202 located in the point of sale terminal 200 reads the data generated by the credit card read/write instrument 201 into a memory 203 for processing by the transaction processing routine 204 resident in the point of sale terminal 200.

The data read from the credit card can comprise simple customer account information, such as account number, credit card expiration date, credit card issuing agency (VISA, MASTERCARD, AMEX), identity of the serving bank. Additional customer related data can also be contained in the credit card and can comprise: one or more customer names and their associated Personal Identification Number (PIN), user authentication data (signature, voiceprint, photograph), encryption key, an the like. Once the data is stored in memory 203, the point of sale terminal 200 requests the customer to input their PIN into the point of sale terminal, typically via a separate customer input device 205. The customer inputs their PIN data into the point of sale terminal at step 303 and the transaction processing routine 204 compares the customer input PIN data with that downloaded from the credit card at step 302 at step 304. If there is a mismatch, the transaction is denied. If the two sets of data match indicating the entry of a valid PIN, then the transaction processing routine 204 advances to step 305, where the read customer authentication data is decrypted if it was stored in encrypted form on the credit card. In the case where there is not a match between the customer provided customer authentication data with that obtained from the credit card, the transaction may be terminated and the processing is shown on FIG. 3 as exiting. However, prior to the Exit step, the process can include a number of options shown at step 313 as "Intervention" which represents the typically manual intervention of the salesperson in the credit verification process. Depending upon the nature of the failure to match, the salesperson may be instructed to seize the credit card, the store security/police authorities may automatically be summoned if the credit card is stolen, or some other action may be taken, such as activating credit card read/write instrument 201 to write data on the machine readable media 102 indicative of an invalid credit card. In any case, processing exits once the intervention processing is completed.

The transaction processing routine 204 at step 306 displays the user authentication indicia to the clerk at point of sale terminal 200 for viewing exclusively by the clerk. The user authentication data can comprise the customer's signature, or immutable physical characteristics of the customer that can be used to uniquely identify the user, such as a photograph of the customer, voiceprint, fingerprint, some set of physical characteristics of the customer (left-handed, height, hair color), or signature input via a pressure sensitive surface on the customer input device 205. The transaction processing routine 204 at step 307 performs the check of the customer provided customer authentication data with that obtained from the credit card. In particular, either the clerk can validate the identity of the customer by visually comparing photograph to the customer's appearance or the comparison can be performed electronically in the point of sale terminal 200 such as comparing the signature data retrieved from the credit card to the signature provided by the customer. In either case, if there is not a match between the customer provided customer authentication data with that obtained from the credit card, the transaction may be terminated and the processing is shown on FIG. 3 as exiting. However, prior to the Exit step, the process can include a number of options shown at step 313 as "Interventions" which represents the typically manual intervention of the salesperson in the credit verification process. Depending upon the nature of the failure to match, the salesperson may be instructed to seize the credit card, the store security/police authorities may automatically be summoned if the credit card is stolen, or some other action may be taken, such as activating credit card read write instrument 201 to write data on the machine readable media 102 indicative of an invalid credit card. In any case, processing exits once the intervention processing is completed.

If a match occurs, the transaction processing routine 204 advances to step 308 where a data communication connection is established with the credit issuing agency. Once the connection is established, at step 309 the transaction processing routine 204 downloads transaction data to the credit issuing agency and at step 310 the credit issuing agency performs the transaction validation process, determining the creditworthiness of the customer. A response is transmitted from the credit issuing agency to the point of sale terminal at step 311 to either authorize the transaction at step 314 or terminate the transaction and exit. Processing then proceeds with the generation of a paper copy of the transaction for the customer's records, and/or updates the credit data written on the machine readable media 102 and possibly prints a copy of the transaction for the point of sale purveyor.

At step 311, another alternative response is the initiation of a telephone connection between an operator at the credit agency and the telephone associated with the point of sale terminal 200 to enable the operator to verbally verify the identity of the customer. The operator can also use this capability to discuss the credit account with the customer, such as to advise the customer of overdue payments, the need to extend the credit limit of the credit card 100, unusual patterns of credit card transactions, and the like.

Alternative Implementations

While the above description notes the traditional credit card purchase scenario, the credit card 100 can be self defining, in that it can maintain available credit data on the machine readable media 102, thereby maintaining all user data locally at the point of sale terminal 200. Such an application can be a prepaid telephone card that is authorized for a predetermined amount of telephone charges. The point of sale terminal 200 can in this instance be a pay phone that is equipped with a credit card read/write instrument 201 to read the data stored on the machine readable media 102 and update the data stored thereon in response to the use of the prepaid telephone card. Thus, some of the data stored on the credit card 100 can be writeable by the point of sale terminal 200. The validation of the customer in this case can be a voiceprint verification, wherein the point of sale terminal 200 compares a phrase stored on machine readable media 102 with one spoken by the customer.

Another application for the credit card 100 is for use with multiple users. For example, the credit card 100 can be assigned to a family, wherein the various family members each have their own credit limit and unique PIN assigned. This enables the single credit card 100 to be shared among multiple users without compromising the integrity of the credit card. In addition to the multiple users, the credit card 100 can include a tamper bit in the machine readable media 102 that is updated with each valid transaction, to be matched by the credit issuing agency computer and updated with each transaction. This tamper bit provides additional security to the credit card 100.

SUMMARY

This system uses a credit card that is devoid of any human readable customer account information and that encodes all the relevant account information on machine readable media built into the credit card. A point of sale terminal scans the credit card to obtain the account information encoded therein. The encoded data may require the user to input a personal identification number PIN to proceed to the next step of the charge process where the account information and user authentication information are compared to ensure validity. If the credit card number and PIN number match the customer data, the point of sale terminal displays a copy of the user's signature (or photograph) for comparison by the clerk with the user's written authorization of the purchase (and/or physical appearance).

What is claimed:

1. A method of operating a secure credit authorizing system that uses a credit card that is devoid of human readable information that relates to a customer account corresponding to said credit card imprinted thereon and that includes a machine readable media for storing information, that relates to said customer account corresponding to said credit card, in machine readable form, said method comprising the steps of:

reading, in response to receipt of a credit card that is devoid of human readable customer account information, said customer account information, including user specific indicia, corresponding to said credit card from said credit card where it is stored exclusively in machine readable form;

receiving user specific data from a user of said credit card;

displaying, in human readable form to a clerk, said user specific indicia read from said credit card; and authorizing, in response to said clerk validating the correspondence of said user specific indicia, read from said credit card where it is stored exclusively in machine readable form, and said user specific data provided to said clerk by said user, a transaction using said credit card.

2. The method of operating a secure credit authorizing system of claim 1 wherein said step of authorizing comprises:

automatically validating the correspondence of said user specific indicia read from said credit card where it is stored exclusively in machine readable form, with said corresponding user provided user specific indicia, to authorize a transaction using said credit card.

3. The method of operating a secure credit authorizing system of claim 2 wherein said step of automatically validating comprises:

comparing a user provided personal identification number with user personal identification data read from said credit card; and comparing a user provided signature with user signature data read from said credit card.

4. The method of operating a secure credit authorizing system of claim 1 wherein said step of storing comprises:

updating, in response to said step of authorizing having authorized a transaction, at least one indicia from the class of customer related data comprising: at least one customer name and their associated Personal Identification Number, user authentication data, encryption key, credit limit, and available credit amount.

5. The method of operating a secure credit authorizing system of claim 1 wherein said step of storing comprises:

updating, in response to said step of authorizing having failed to authorize a transaction, at least one indicia from the class of customer related data comprising: at least one customer name and their associated Personal Identification Number, user authentication data, encryption key, credit limit, and available credit amount.

6. The method of operating a secure credit authorizing system of claim 1 wherein said step of storing comprises:

storing at least one indicia from the class of customer related data comprising: at least one customer name and their associated Personal Identification Number, user authentication data, encryption key, credit limit, and available credit amount.

7. A secure credit authorizing system that uses a credit card that is devoid of human readable customer account information that relates to a customer account corresponding to said credit card imprinted thereon and that includes a machine readable media for storing information, that relates to said customer account corresponding to said credit card, in machine readable form, comprising:

means, responsive to receipt of a credit card that is devoid of human readable customer account information, for reading said customer account information, including user specifict indicia, corresponding to said credit card from said credit card where it is stored exclusively in machine readable form;

means for receiving user specific data from a user of said credit card; displaying, in human readable form to a clerk, said user specific indicia read from said credit card; and means, responsive to said clerk validating the correspondence of said user specific indicia, read from said credit card where it is stored exclusively in machine readable form, and said user specific data provided to said clerk by said user, for authorizing a transaction using said credit card.

8. The secure credit authorizing system of claim 7 wherein said means for authorizing comprises:

means for automatically validating the correspondence of said user specific indicia read from said credit card where it is stored exclusively in machine readable form, with said corresponding user provided user specific indicia, for authorizing a transaction using said credit card.

9. The secure credit authorizing system of claim 8 wherein said means for automatically validating comprises:

means for comparing a user provided personal identification number with user personal identification data read from said credit card; and means for comparing a user provided signature with user signature data read from said credit card.

10. The secure credit authorizing system of claim 7 wherein said means for storing comprises:

means for storing at least one indicia from the class of customer related data comprising: at least one customer name and their associated Personal Identification Number, user authentication data, encryption key, credit limit, and available credit amount.

* * * * *